March 26, 1968     S. KYSER     3,374,526
PISTON RING COMPRESSOR
Filed Sept. 3, 1965     3 Sheets-Sheet 1
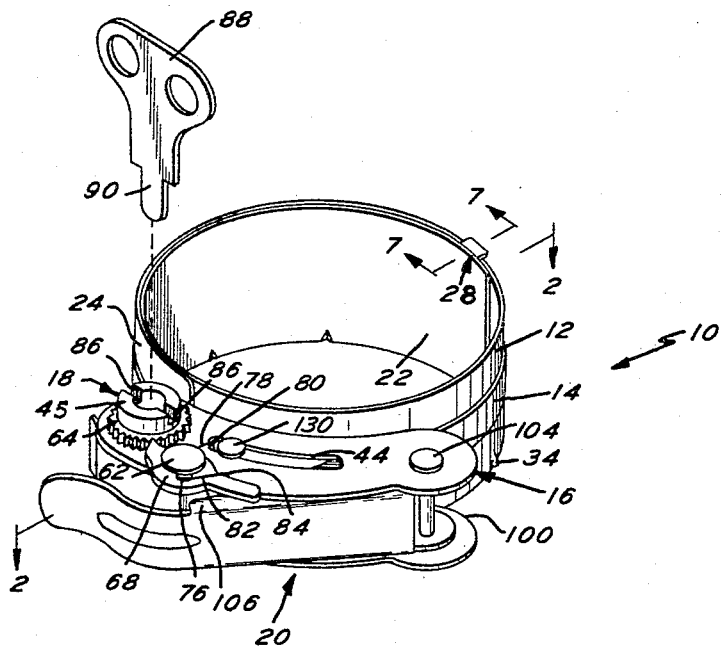
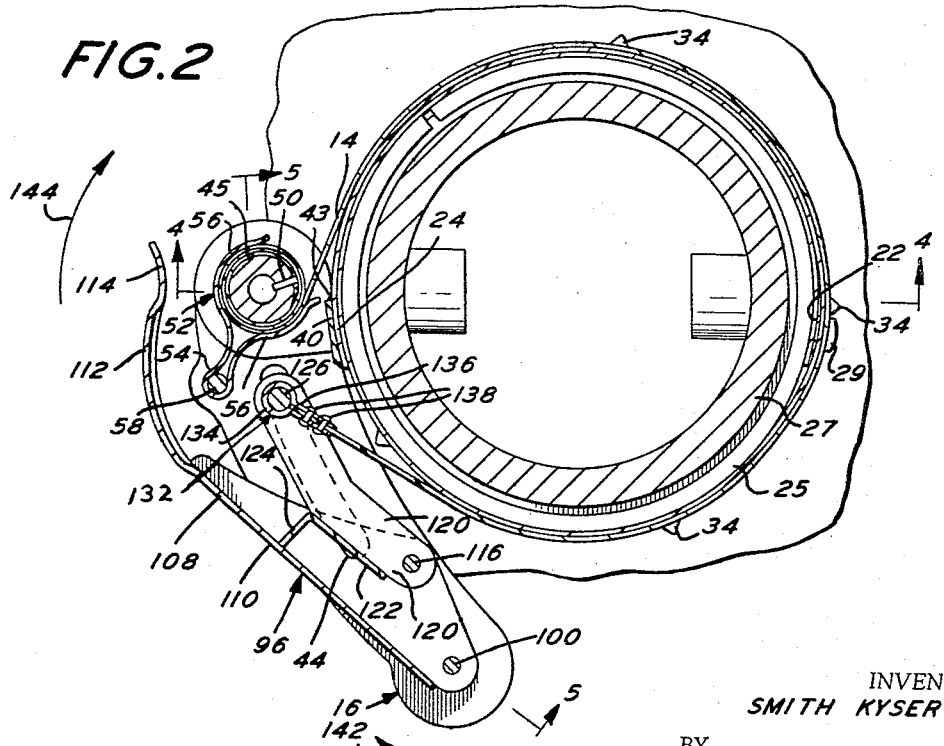
INVENTOR.
SMITH KYSER
BY Caesar, Rivise, Bernstein and Cohen
ATTORNEYS.

March 26, 1968   S. KYSER   3,374,526
PISTON RING COMPRESSOR
Filed Sept. 3, 1965   3 Sheets-Sheet 2

INVENTOR.
SMITH KYSER
BY
Caesar, Rivise, Bernstein and Cohen
ATTORNEYS.

March 26, 1968     S. KYSER     3,374,526
PISTON RING COMPRESSOR
Filed Sept. 3, 1965     3 Sheets-Sheet 3
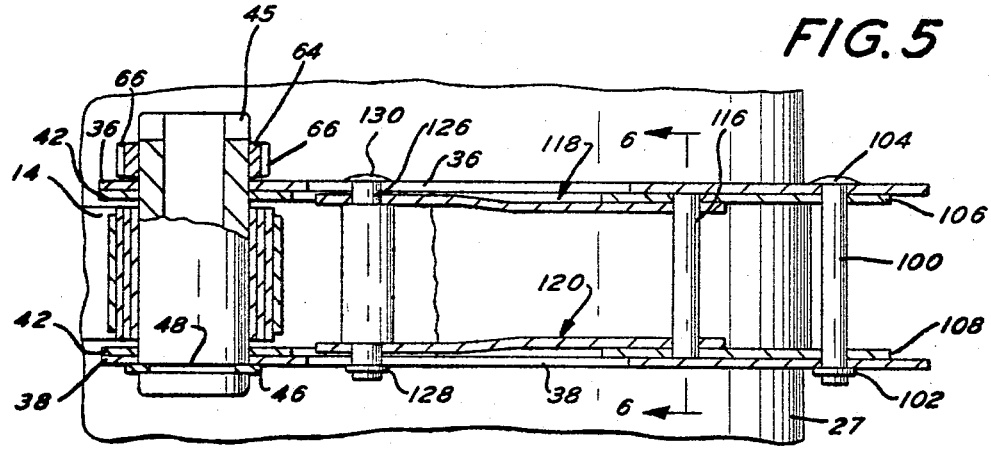
FIG. 5
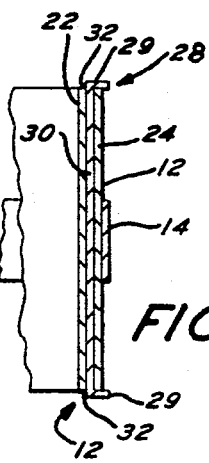
FIG. 7
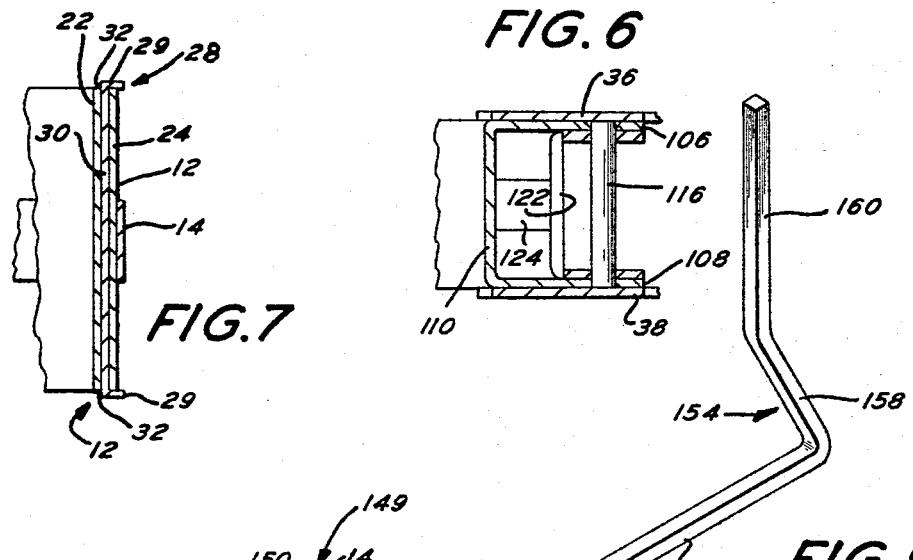
FIG. 6
FIG. 9
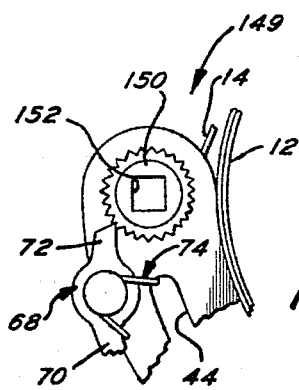
FIG. 8
INVENTOR.
SMITH KYSER
BY
Caesar, Rivise, Bernstein and Cohen
ATTORNEYS.

United States Patent Office 3,374,526
Patented Mar. 26, 1968

3,374,526
PISTON RING COMPRESSOR
Smith Kyser, Ionia County, Mich., assignor to Aircraft Specialties, Inc., Lapeer, Mich., a corporation of Delaware
Filed Sept. 3, 1965, Ser. No. 484,868
9 Claims. (Cl. 29—222)

ABSTRACT OF THE DISCLOSURE

A piston ring compressor which includes a spring compression band, a housing and a tension band associated with the housing which embraces and limits the diameter of the compression band. Adjusting means are also provided which are attached to the tension band for adjusting the diameter of the compression band. Lever means are also connected to the tension band for quickly expanding and restoring the diameter of the compression band to facilitate placement on and removal from a piston without requiring further adjustment.

---

This invention relates to a new and improved piston ring compressor which is adjustable to a range of piston ring sizes and which includes a lever attachment for facilitating placement of the piston ring compressor on a piston.

Existing piston ring compressors for compressing the rings engaged in the annular grooves of a piston prior to the inserting of the piston in a cylinder possess numerous disadvantages. The most salient of these is that adjustment and placement of the piston ring compressor about the rings is difficult and time consuming. Furthermore, the adjustment must be repeated for the rings on each piston. Additionally, many of the piston ring compressors currently in use can accommodate only a narrow range of piston ring sizes.

It is therefore an object of this invention to provide a piston ring compressor which overcomes the aforementioned disadvantages.

Another object of the invention is to provide a new and improved piston ring compressor which is easily placed on the piston and which is easily adjusted.

Another object of the invention is to provide a new and improved piston ring compressor which is usable on a range of piston ring sizes and which requires only a single adjustment for an entire set of pistons.

These and other objects are accomplished by providing a piston ring compressor comprising a compression band having overlapping ends movable with respect to each other, a housing, a tension band associated with said housing embracing and limiting the diameter of said compression band in accordance with the tension applied thereto, adjusting means attached to said tension band for adjusting the diameter of said compression band and lever means connected to said tension band for quickly expanding and restoring the diameter of said compression band.

Other objects and many of the attendant advantages of this invention will be readily appreciated as the same becomes better understood by reference to the following detailed description when considered in connection with the acompanying drawings wherein:

FIG. 1 is an exploded perspective view of a piston ring compressor embodying the invention;

FIG. 2 is an enlarged sectional view taken along the line 2—2 in FIG. 1;

FIG. 5 is an enlarged sectional view taken along the line 5—5 in FIG. 2;

FIG. 6 is an enlarged sectional view taken along the line 6—6 in FIG. 5;

FIG. 7 is an enlarged sectional view taken along the line 7—7 in FIG. 1;

FIG. 8 is a plan view of an alternate embodiment of the ratchet assembly; and

FIG. 9 is a perspective view of a wrench used with the alternate ratchet assembly.

Figure 3:
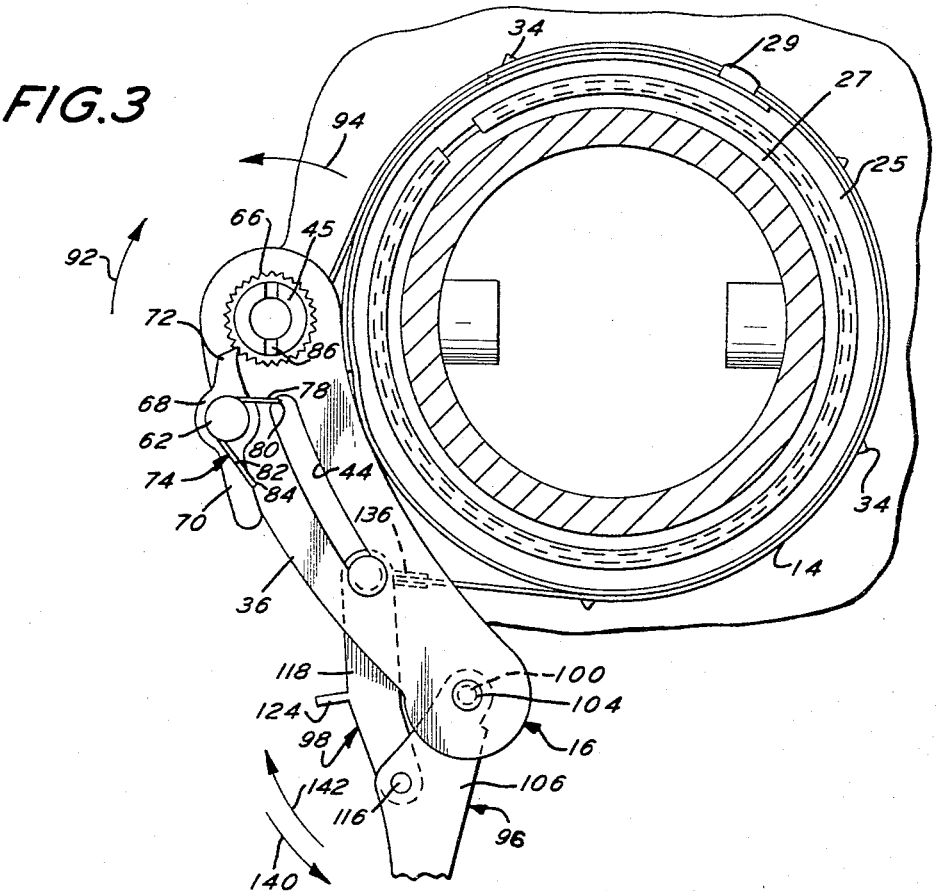
FIG. 3 is an enlarged plan view, partially in section, of the piston ring compressor engaging a piston with the rings inserted in the grooves thereof prior to insertion in the block of an engine.

Referring now in greater detail to the various figures of the drawings wherein similar reference characters refer to similar parts, a piston ring compressor embodying the present invention is generally shown at 10 in FIG. 1. Device 10 is basically comprised of a compression band 12, a tension band 14, a housing 16, an adjustment ratchet assembly 18 and a lever means 20.

Compression band 12 is comprised of spring steel and has overlapping ends 22 and 24 which are movable with respect to each other and cause the compression band to form a circular coil. With the ends overlapping, the compression band 12 is adapted to compress rings 25 (FIG. 4) which are engaged in the annular groove 26 of piston 27. Aligning means 28 comprised of a U-shaped bracket having a pair of radially extending legs 29 and an integral bridging section 30 substantially transverse thereto which is attached to the end 24 of compression band 12 by suitable means such as welding the bridging section 30 to the end 24 as at 32 (FIG. 7). End 24 rides over the bridging section 30 and is prevented from transverse movement with respect to end 22 by legs 29. Outstruck portions 34 are provided along the lower edge of the compression band 12 for a purpose which will hereinafter appear.

The normal tendency of the compression band 12 is to open up and straighten out. The function of the tension band 14 is to prevent this and limit the diameter of the compression band.

Tension band 14 consists of thin, flexible steel, and is connected between the adjusting means 18 and the lever means 20 around and embracing the compression band 12. The diameter of the compression band 12 is adjusted by varying the length of the tension band by means of the adjusting means 18. Thus, the diameter of the compression band 12 is varied in accordance with the amount of tension applied to tension band 14. That is, as the tension band 16 is shortened, the amount of tension is increased and the diameter of the compression band 12 is decreased.

Figure 4:
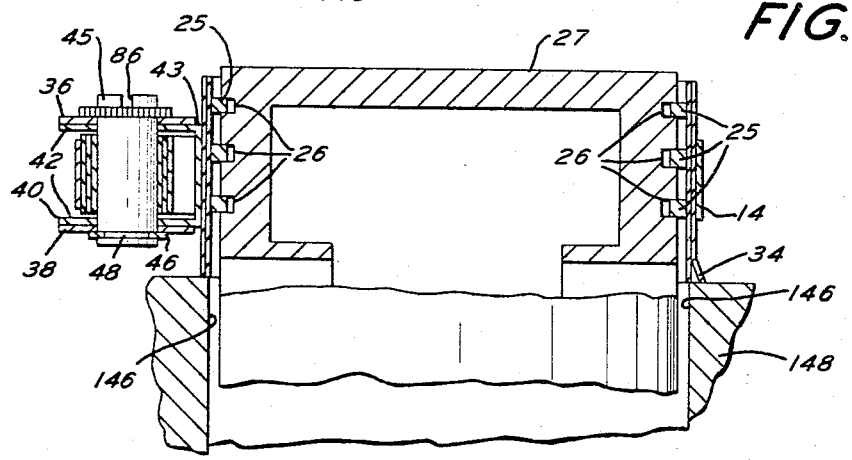
FIG. 4 is an enlarged sectional view taken along the line 4—4 in FIG. 2.

Housing 16 cradles the adjusting means 18 and lever means 20 and is generally comprised of a planar extended top plate 36, a similar bottom plate 38 and a U-shaped bracket 40 (FIG. 4). Plates 36 and 38 are arcuately shaped in order to accommodate the curvature of the compression band 12. They are parallel with respect to each other and are spaced by U-shaped bracket 40 which is comprised of legs 42 which are suitably secured to the top plate 36 and bottom plate 38, respectively, at the inner surfaces thereof. Legs 42 are connected by a transverse integral bridging section. The bridging section is suitably secured to end 24 of compression band 12 at 43 (FIG. 2 and FIG. 4). Slots 44 are provided centrally in plates 36 and 38 and are aligned with respect to each other. They are arcuately shaped in the manner of the top and bottom plates at their central sections.

Adjusting ratchet assembly 18 is mounted in the U-shaped bracket 40 and top plate 36 and bottom plate 38. Assembly 18 includes tube 45 which passes transversely through top and bottom plates 36 and 38 and legs 42, and is rotatably mounted therein. As seen in FIG. 5, tube 45 is secured in place against bottom plate 38 by a collar 46 which is maintained in an annular groove 48 on the exterior surface of the tube adjacent its lower end. Collar 46 is made of spring steel and is split at one end in order that it can be forced over the tube and be engaged in the annular groove 48. This collar has an outer diameter which is larger than the opening through which tube 45 passes thereby restraining the tube 45 against upward transverse movement with respect to the top plates.

Tension band 14 is wound as a coil around tube 45 and is maintained between the legs 42 of the U-shaped bracket 40. Tension band 14 is secured to the tube 45 by rivet 50 (FIG. 2). A tension clip 52 (FIG. 2) passes around the coil of tension band 14. Tension clip 52 is unitary and includes a U-shaped end 54 and arcuately disposed walls 56. The U-shaped end 54 is telescoped over a pin 58 which passes through upper and lower plates 36 and 38. The lower end of pin 58 is secured in place by a collar similar to collar 46 which is maintained in an annular groove adjacent the end of the pin. The upper end of the pin 58 is maintained in place by enlarged head 62. Tension clip 52 has sufficient resiliency to expand or contract as the coil of tension band 14 increases and decreases when it is wound around tube 44. Without clip 52, the rotation of the ratchet assembly in a counterclockwise direction as seen in FIG. 2 would cause only an unraveling of the coil. That is, instead of the band 14 being made larger, the diameter of the coil of the tension band within the ratchet would increase, thereby taking up the extra length of the tension band. Tension clip 52 prevents this occurrence by keeping the coil tightly wrapped. A ratchet wheel 64 having a hollow core is telescoped over tube 45 and is secured at the top thereof by a pressed fit. Alternatively, ratchet wheel 64 can be integrally formed on tube 45. As seen in FIG. 5, the lower surface of ratchet wheel 64 abuts the upper surface of top plate 36 and in combination with collar 46 restrains transverse movement of tube 45 with respect to plates 36 and 38 thereby maintaining the tube in place. Ratchet wheel 64 includes ratchet teeth 66 along the entire outer circumference thereof.

A pawl 68 is pivotally mounted on the top plate 36 about pin 58 and is held in place by enlarged head 62 of the pin. Pawl 68 includes a lever arm 70 and a finger 72. The finger 72 of pawl 68 is urged into locking engagement with ratchet teeth 66 by means of spring 74. Spring 74 includes a central coiled portion 76 which is telescoped over pin 58 and positioned between the underside of head 62 and the top surface of pawl 68. Spring 74 further includes a first arm 78 with a loop 80 that is hooked over the edge of slot 44. Spring 78 further includes a second arm 82 with a loop 84 which is hooked over the lever arm 70 of pawl 68. The normal tendency of the spring 74 is for arms 78 and 82 to diverge. Therefore, in the position shown in FIG. 3, the spring urges finger 72 of pawl 68 into ratchet teeth 66.

In a first embodiment, the top of tube 45 is provided with a transverse groove 86. The purpose of this groove is to receive a winding key 88 (FIG. 1). Key 88 includes a T-shaped end 90. It is thus seen in FIG. 1 that the leg of T 90 will pass into the center of tube 45 and the arms or shoulders of the T are received in slot 86. Rotation of the key in a clockwise direction as indicated by arrow 92 in FIG. 3 tightens the tension band 14, thereby decreasing the diameter of the compression band 12. Rotation of the key in the direction indicated by arrow 94 (FIG. 3) is prevented by the finger of pawl 68 and ratchet 64 unless the finger 72 and teeth 66 are disengaged. Rotation in the direction of arrow 94 when the pawl and ratchet are disengaged results in loosening of the tension band 14 and concurrent increase in the diameter of compression band 16.

Lever means 20 is also mounted in the housing 16. The lever means 20 is basically comprised of a lever arm 96 and a pivotal link 98. Lever arm 96 is pivotably mounted about pin 100 which passes transversely through the top and bottom plates 36 and 38 respectively. Pin 100 is maintained between the plates 36 and 38 by a split collar 102 which is engaged in an annular groove on the outer surface thereof adjacent the bottom of pin 100 and an enlarged head 104 which is secured to the top thereof.

Lever arm 96 comprises a planar top leg 106, a bottom leg 108 and an integral bridging section 110 (FIG. 6). Pin 100 also passes transversely through the top and bottom leg which are parallel to each other and are mounted within the top and bottom plates 36 and 38, respectively, of the housing 16. Thus the lever arm is maintained within the housing 16 by the inner surfaces of top and bottom plates 36 and 38 which bear against the outer surfaces of top and bottom legs 106 and 108, respectively. Bridging section 110 also includes ribbed section 112 formed therein and a flared lip 114. The ribbed section serves to reinforce the lever and lip 114 aids in grasping the lever arm 98.

Link 98 is pivotally mounted in lever arm 96 about pin 116. Link 98 has a top plate 118, a similar bottom plate 120 and an integral bridging section 122 which is substantially perpendicular thereto. Pin 116 passes transversely through plates 118 and 120. It is mounted in lever arm 96 by flaring the top thereof toward its end, countersinking the opening therefor in the top leg 106 of lever arm 96 and by peening the bottom end thereof to secure it in the bottom leg 108. The pin does not extend beyond the outer surfaces of legs 106 and 108 so that the lever arm 96 can fit within plates 36 and 38 of housing 16. Bridging section 122 of link 98 includes a flange 124 which is perpendicular thereto and projects toward the lever 96. The purpose of flange 124 will appear hereinafter.

Link 98 is also pivotally mounted to the housing 16 about pin 126. Pin 126 is slidably mounted in slot 44 of the bracket 16. Pin 126 is maintained within the housing 16 by a split collar 128 which is engaged in an annular groove on the outer surface of pin 126 adjacent the lower end thereof and by an enlarged head 130 secured to the top of pin 126. Also mounted on pin 126 between plates 118 and 120 is a split collar 132. Collar 132 comprises a web 134 which is telescoped over pin 126 and a pair of integral radially extending flanges 136. The end of tension band 14 is secured between flanges 136 by a pair of rivets 138.

As seen in FIG. 5, the plates 118 and 120 are closer at their ends pivoted about pin 116 than at the end pivoted about pin 126 so that the outer surfaces of plates 118 and 120 abut the inner surfaces of legs 106 and 108 as well as the inner surfaces of plates 36 and 38.

It can thus be seen that the tension band 14 is operatively connected to the lever arm 96 via link 98. Rotation of the lever arm therefore quickly loosens or tightens the tension band 14 to effect a quick placement on or removal of the device from a piston.

In operation, lever arm 96 is rotated to its most counterclockwise position as indicated by arrow 140 in FIG. 3 to open the device 10. The compression band 12 is placed over the piston 27 and around the rings 25 thereon. Lever arm 96 is then rotated in the clockwise direction indicated by arrow 142 to a position slightly intermediate its ultimate clockwise position shown in FIG. 2. The leg 90 of key 88 is next inserted in the grooves 86 of tube 45 and the key is rotated in the direction of arrow 144, thereby tightening the tension band 14. This in turn reduces the diameter of the compression band 12 which in turn engages rings 25, thereby reducing the diameter thereof and forcing them into annular grooves 26 in the piston 27. At the point where it becomes difficult to turn key 88 further, the key is removed and the lever arm is rotated to its most clockwise position as shown in FIG. 2 thereby causing the tension band 14 to be slightly more tightened. In this position, lever arm 96 is locked against further movement by the over-the-center action of the lever assembly 16 through plates 118 and 120 and by flange 124. That is, the lever arm is prevented from being moved further in a clockwise direction as indicated by arrow 144 in FIG. 2 by flange 124. Flange 124 is provided to stop the lever arm so that an operator's fingers cannot be caught between lip 114 of the lever arm and clip 52. The lever arm 96 is locked in place by link 98. Thus the tension from band 14 cannot cause the inadvertent opening of the lever arm. The tension forces transmitted by band 14 to link 98 via pin 126 are in turn transmitted to lever arm 96 via pin 116. Since pin 116 has passed through the imaginary line between pin 126 and pin 100, when lever arm 96 is in its final position, the force imparted by pin 126 to pin 116 is in a clockwise direction about pin 100, and thereby acts as a force urging lever arm 96 against flange 124, thereby locking lever arm 96 in place.

After the compression band 12 has sufficiently reduced the diameter of rings 25, it is aligned with the cylinder walls 146 in block 148 (FIG. 4). The piston 27 is then forced into the cylinder opening and rings 26 are thereby slid along the inner surface of the compression band and are not able to expand before being inserted into the opening of cylinder 146. The outstruck portions 34 prevent the compression band from following the piston into the cylinder and after the last piston ring 25 has been inserted in the cylinder the device 10 is freed.

It can be seen that it merely requires the counterclockwise rotation of lever arm 96 to make the piston ring compressor 10 ready to receive another piston of the set. Further adjustments are unnecessary because pawl 68 and ratchet 64 are not disengaged after each use of the device. The compression band 12 is placed around the rings of the next piston and only a manual rotation of the lever arm 96 to its most clockwise position is necessary to compress the rings because the adjustment of ratchet assembly has been made on the first piston. Thus further time consuming adjustments are thereby unnecessary. In the prior art piston ring compressors it is necessary to readjust the compressor every time another piston is used.

An alternate embodiment of the adjustment ratchet assembly is shown in FIG. 8 and is indicated generally at 149. The modification of the assembly 149 with respect to assembly 118 is to the hollow tube 150 which has a substantially square core 152 rather than the cylindrical core of tube 45 of the embodiment shown in FIGS. 1 through 7. It operates in a similar manner to the assembly 18 of the first embodiment and in place of a key 88 a wrench 154 is provided as shown in FIG. 9. Wrench 154 is comprised of an elongated steel rod of substantially square cross section and includes a straight section 156 which is inserted in the core 152 of tube 150, another straight section 158 which is integral with section 156 and at an acute angle thereto, and a final straight section 160 which is integral with section 158 and substantially perpendicular to section 156. Section 160 is used as a lever arm to rotate the wrench about the longitudinal axis through section 156. It is understood that the function of sections 156 and 160 may be reversed which is advantageous where lateral space is restricted.

Obviously many modifications and variations of the present invention are possible in the light of the above teachings. It is, therefore, to be understood that within the scope of the appended claims, the invention may be practiced otherwise than as specifically described.

What is claimed as the invention is:

1. A piston ring compressor comprising a spring compression band having overlapping ends movable with respect to each other, a housing, a tension band associated with said housing for embracing and limiting the diameter of said compression band in accordance with the tension applied to said tension band, adjusting means attached to said tension band for adjusting the diameter of said compression band and lever means connected to said tension band for quickly expanding and restoring the diameter of said compression band to facilitate placement on and removal from a piston, said lever means comprising a lever arm rotatably mounted in said housing, an elongated link being pivotally secured at one end to said lever arm, said housing having an elongated slot, a pin mounted slidably in said slot, said link being pivotally secured at its other end to said slidably mounted pin and means for securing an end of said tension band to said pin so that rotation of said lever arm results in movement of said end of said tension band.

2. A piston ring compressor for reducing the diameter of the rings engaged in the annular grooves of a piston prior to insertion thereof in a cylinder comprising a spring compression band having overlapping ends which are movable with respect to each other, a tension band embracing said compression band for limiting the diameter of said compression band, a housing, said housing comprising a planar elongated arcuate top plate, a similar bottom plate and a U-shaped bracket at one end for spacing and aligning said plates, and means in said housing connected to said tension band for adjusting the diameter of said compression band so that further adjustment of said compression band is unnecessary for the compression of rings for similar pistons, said adjusting means being mounted within said bracket and said plates at one end thereof, said piston ring compressor further comprising lever means mounted in the other end of said housing said lever means being connected to said tension band for quickly expanding and contracting said compression band and having an over-the-center locking action for maintaining said compression band at a contracted diameter.

3. A piston ring compressor for reducing the diameter of the rings engaged in the annular grooves of a piston prior to insertion thereof in a cylinder comprising a spring compression band having overlapping ends which are movable with respect to each other, a tension band embracing said compression band for limiting the diameter of said compression band, a housing, said housing comprising a planar elongated arcuate top plate, a similar bottom plate and a U-shaped bracket at one end for spacing and aligning said plates, and means in said housing connected to said tension band for adjusting the diameter of said compression band so that further adjustment of said compression band is unnecessary for the compression of rings for similar pistons, said adjusting means being mounted within said bracket and said plates at one end thereof, said piston ring compressor further comprising lever means which are mounted in the other end of said housing, said housing further including a slot in each of said top and bottom plates aligned with respect to each other, a pin slidably engaged in said slots, said pin being secured to an end of said tension band, said lever means being comprised of a lever arm pivotably mounted at said other end of said housing, and elongated link means being pivotably mounted at a first end thereof in said lever arm and said other end being pivotably mounted about said pin so that rotation of said lever arm causes said tension band to be drawn by said pin in said slot to effect quick tightening and loosening thereof.

4. A piston ring compressor comprising a spring compression band having overlapping ends movable with respect to each other, a housing, a tension band associated with said housing for embracing and limiting the diameter of said compression band in accordance with the tension applied to said tension band, adjusting means attached to said tension band for adjusting the diameter of said compression band, said adjusting means being mounted in said housing and comprising a tube rotatably mounted in said housing, said tube being attached to an end of said tension band, said tension band being wound as a coil about said tube, means for rotating said tube for adjusting the tension on said band and lever means connected to said tension band for quickly expanding and restoring the diameter of said compression band to facilitate placement on and removal from a piston, said lever means being provided with an over-the-center action to lock said compression band at said diameter for restoring.

5. A piston ring compressor for reducing the diameter of the rings engaged in the annular grooves of a piston prior to insertion thereof in a cylinder comprising a spring compression band having overlapping ends which are movable with respect to each other, means secured to an end of said compression band for maintaining vertical alignment of said overlapping ends comprising a U-shaped bracket having a pair of legs and a bridging section, said bridging section being secured to the inner overlapping end so that said legs prevent vertical movement of the outer end with respect to said inner end, a tension band embracing said compression band for limiting the diameter of said compression band, a housing, said housing comprising a planar elongated arcuate top plate, a similar bottom plate and a U-shaped bracket at one end for spacing and aligning said plates, and means in said housing connected to said tension band for adjusting the diameter of said compression band so that further adjustment of said compression band is unnecessary for the compression of rings for similar pistons, said adjusting means being mounted within said bracket and said plates at one end thereof, said piston ring compressor further comprising lever means which are mounted in the other end of said housing.

6. A piston ring compressor for reducing the diameter of the rings engaged in the annular grooves of a piston prior to insertion thereof in a cylinder comprising a spring compression band having overlapping ends which are movable with respect to each other, a tension band embracing said compression band for limiting the diameter of said compression band, a housing, said housing comprising a planar elongated arcuate top plate, a similar bottom plate and a U-shaped bracket at one end for spacing and aligning said plates, and means in said housing connected to said tension band for adjusting the diameter of said compression band so that further adjustment of said compression band is unnecessary for the compression of rings for similar pistons, said adjusting means being mounted within said bracket and said plates at one end thereof and comprising a tube rotatably mounted in said one end of said housing, said tube being secured to an end of said tension band, said tension band being wound as a coil about said tube, means for rotating said tube to adjust the tension in said band and a tension clip embracingly mounted about said coil for preventing loosening of tension in said coil, said piston ring compressor further comprising lever means which are mounted in the other end of said housing.

7. The compressor of claim 4 and further comprising a ratchet wheel peripherally associated with said tube adjacent the top thereof, and a pawl pivotably mounted on said housing, said pawl being spring urged to engage said ratchet wheel to prevent the loosening of tension on said tension band.

8. The compressor of claim 2 wherein said adjusting means is comprised of a tube rotatably mounted in said one end of said housing, said tube being secured to an end of said tension band, said tension band being wound as a coil about said tube, and means for rotating said tube to adjust the tension in said tension band.

9. The compressor of claim 3 wherein said linking means further includes a substantially perpendicular flange which is adapted to stop said lever arm in a locked position.

References Cited

UNITED STATES PATENTS

| | | | |
|---|---|---|---|
| 1,148,472 | 7/1915 | Adams | 29—222 |
| 1,414,014 | 4/1922 | Genett | 29—222 |
| 1,452,468 | 4/1923 | Lee | 29—224 |
| 1,849,532 | 3/1932 | McDevitt | 29—222 |
| 1,910,729 | 5/1933 | Wheat | 29—222 |
| 2,305,486 | 12/1942 | Miller | 29—222 |
| 1,347,764 | 7/1920 | Shirley | 81—64 X |

OTHELL M. SIMPSON, *Primary Examiner.*

J. C. PETERS, *Assistant Examiner.*